Sept. 1, 1931.    J. P. CROWLEY    1,821,618
APPARATUS FOR THE MANUFACTURE OF SHEET GLASS
Filed Nov. 25, 1929    2 Sheets-Sheet 2

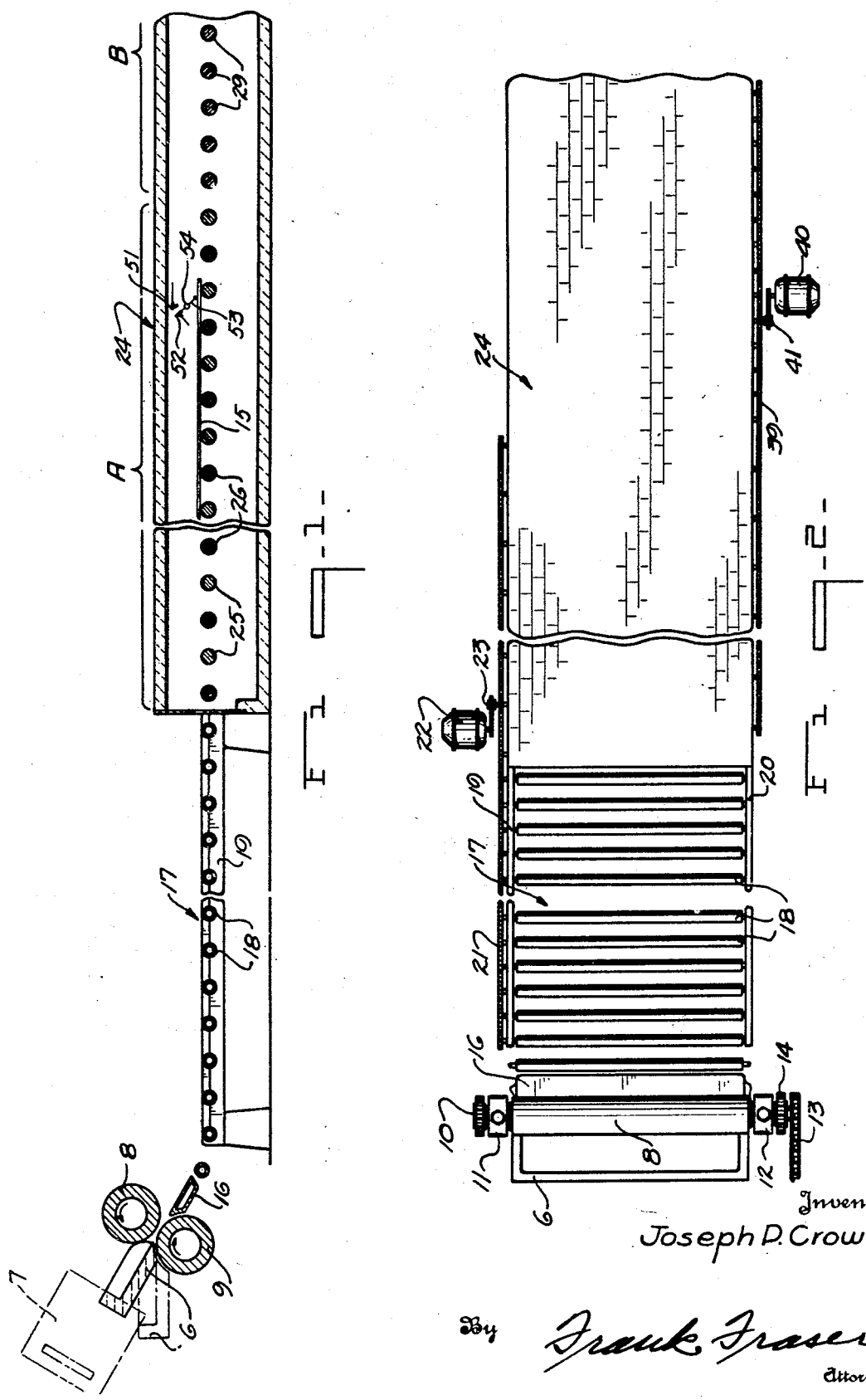

Inventor
Joseph P. Crowley
By Frank Fraser
Attorney

Patented Sept. 1, 1931

1,821,618

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

APPARATUS FOR THE MANUFACTURE OF SHEET GLASS

Application filed November 25, 1929. Serial No. 409,530.

This invention relates broadly to apparatus for forming and annealing sheet or plate glass and more particularly to improvements in apparatus for receiving glass sheets or plates which are intermittently formed and delivering them into an annealing zone.

In the production of successive sheets of glass by an intermittent rolling operation, it is desirable that the formation of the sheet be performed at a relatively great speed as compared to the speed at which it travels in annealing. This rapid formation of the glass sheet is desirable from both the standpoint of production and quality while the travel of the sheet during annealing is necessarily slow in order to avoid making the annealing apparatus of great length.

The general object of the present invention resides broadly in the provision of apparatus whereby successive sheets of glass may be intermittently formed at a relatively high rate of speed and subsequently annealed while traveling at a speed relatively less than the forming speed.

Another object of the invention is the provision of apparatus for effecting the reduction in the speed of travel of the sheet as it is being carried forwardly, whereby the movement of the sheet can be dropped from its relatively high forming speed to a relatively slower annealing speed in an easy, convenient and efficient manner and without the necessity of stopping the sheet or shifting it either vertically or laterally.

A further object of the invention is the provision of means preferably, though not necessarily, controlled by movement of the sheet for automatically causing the change in the speed of travel thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus provided by the present invention showing only the forward end portion of the annealing leer, Fig. 2 is a plan view thereof, Fig. 3 is a sectional detail view of a portion of the apparatus showing the overrunning clutch for certain of the low speed rolls.

Figure 3:
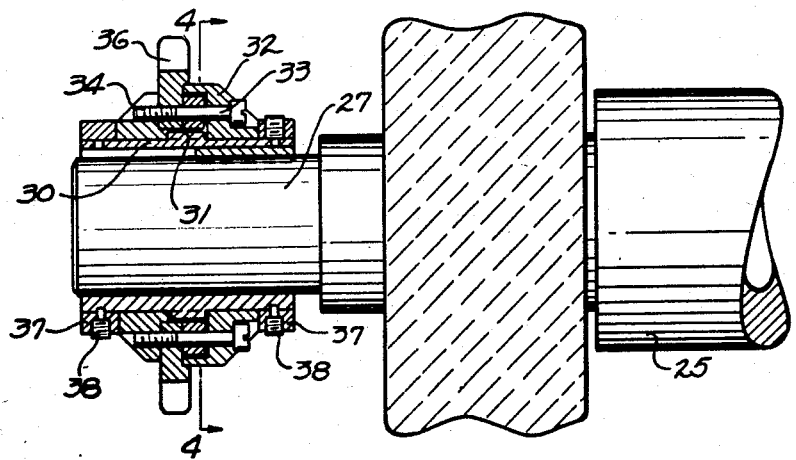

Referring to the drawings, 6 designates a receiver or support adapted to receive thereupon from a pot or other suitable receptacle 7, a mass or charge of molten glass to be reduced to sheet form. The molten glass is preferably supplied to the receiver 6 when the same is in a substantially horizontal position as indicated by the broken lines in Fig. 1, after which the pot 7 is removed and the receiver tilted upwardly to cause the molten glass to move downwardly between a pair of forming rolls 8 and 9. The forming rolls are spaced from one another to create a sheet forming pass therebetween and are mounted upon shafts 10 rotatably supported at their opposite ends by members 11 and 12.

As pointed out above, it is desirable that the molten glass be rapidly reduced to sheet form and the forming rolls 8 and 9 are consequently driven at a relatively high peripheral speed during the supplying of the molten glass thereto. One of the forming rolls may be positively driven as by suitable driving means 13 and the other roll driven from the first roll through intermeshing gears 14 mounted upon the roll shafts 10.

The glass sheet or plate made by the forming rolls is indicated at 15 and the said sheet is supported upon and guided downwardly as it leaves the forming rolls by an inclined runway or chute 16. Positioned adjacent the chute 16 and adapted to receive the glass sheet or plate 15 therefrom is a horizontal conveyor table designated in its entirety by the numeral 17 and being preferably composed of a plurality of horizontally aligned rolls 18 mounted upon shafts which are rotatably supported at their opposite ends in the side frames 19 and 20. The rolls 18 may be driven in any desired manner such as by keying to the shaft of each roll a sprocket (not shown) and training about all of the sprockets a sprocket chain 21 driven from a motor 22 through suitable reduction gearing 23.

Figure 5:
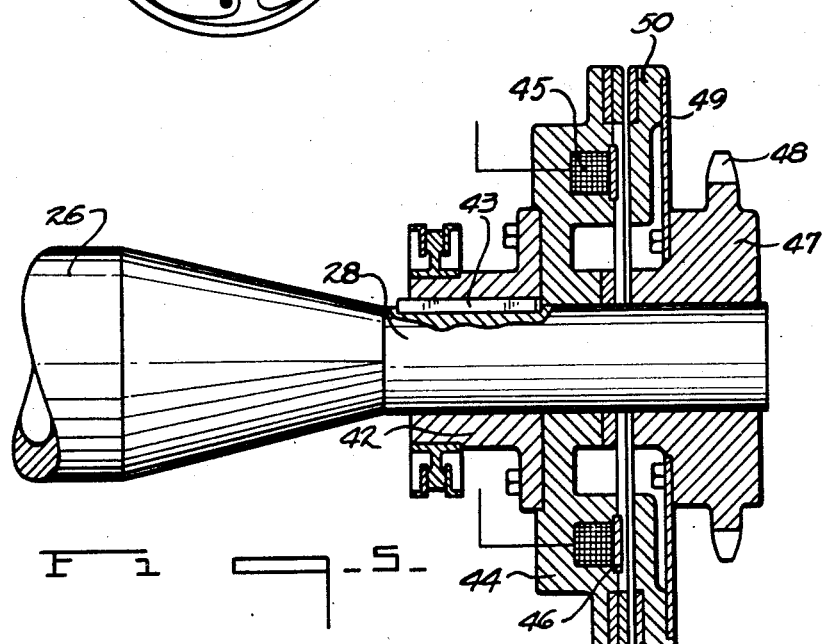
Fig. 5 is a sectional detail view of the magnetic clutch means for certain of the high speed rolls.

Arranged at the end of the conveyor table 17 is an annealing leer 24 which is divided into two units or sections A and B, the section A being termed the receiving or transfer section of the leer and B the annealing section. The receiving section A is composed of a plurality of low speed rolls 25 (driven at annealing speed) and a plurality of high speed rolls 26 (driven at rolling speed), the low speed rolls and the high speed rolls being arranged alternately with one another and positioned in horizontal alignment with the rolls 18 of conveyor table 17. The low speed rolls 25 are carried upon shafts 27 (Fig. 3) while the high speed rolls 26 are carried by shafts 28 (Fig. 5). These shafts 27 and 28 are journaled in the opposite side walls of the leer 24 and project at one end therebeyond. The annealing section B of the leer is composed of a plurality of low speed rolls 29 arranged in horizontal alignment with the rolls 18, 25 and 26 and driven at a constant annealing speed.

Figure 4:
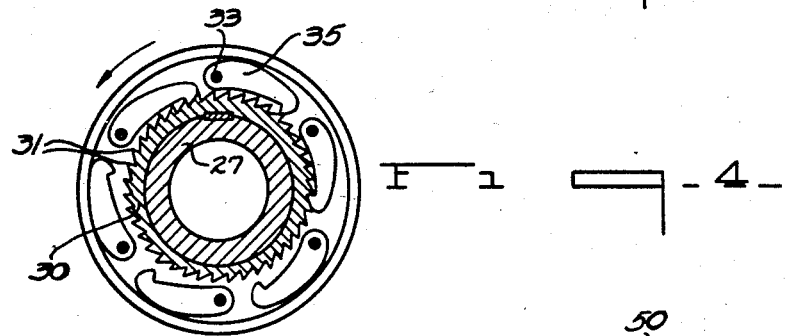
Fig. 4 is a section taken substantially on line 4—4 of Fig. 3.

According to the invention, the rolls 25 of leer section A are adapted to be positively driven at a relatively slow speed substantially equal to the slow speed of the rolls 29 of leer section B. However, the rolls 25 are free to overrun so that while they are positively driven at a low speed, they may be rotated by the sheet passing thereover at a greater speed and thereby caused to overrun their driving means. This is herein accomplished by the provision of overrunning clutches which may be of the type illustrated in Figs. 3 and 4. These overrunning clutches include a sleeve 30 keyed to the shaft 27 of the respective low speed roll 25 and being provided with ratchet teeth 31. Encircling the sleeve 30 is a ring 32 through which extend a plurality of pivot pins 33, screw threaded at one end as at 34 to prevent accidental displacement thereof. The pins 33 are adapted to carry pawls 35 and also a sprocket wheel 36. The collar members 37 and screws 38 are provided to prevent accidental displacement of the ring 32 and associated parts. The sprocket wheels 36 of the several low speed rolls 25 have trained thereabout a sprocket chain 39 driven from a motor 40 through suitable reduction gearing 41 and are adapted to rotate in the direction indicated by the arrow in Fig. 4.

Normally, the pawls 35 engage the teeth 31 on sleeve 30 to positively drive the rolls. In the event, however, that the linear speed of the glass sheet 15 exceeds the peripheral speed of the rolls, due to frictional contact between the sheet and rolls, the sheet is allowed to drive the rolls faster than they are positively driven. When this occurs, the pawls 35 simply ride freely over the teeth 31 upon rotation of sleeve 30. As will be seen upon reference to Fig. 2, the leer rolls 29 can be driven from the same driving means as the low speed rolls 25 if desired or a separate drive can be provided therefor. However, the rolls 29 are not provided with overrunning clutches.

The present invention also consists in constructing the driving means for the high speed rolls 26 so that the said driving means can be disconnected from the rolls when desired to allow said rolls to freely rotate as idler rolls. This is accomplished by the use of a magnetic clutch associated with each high speed roll as shown in Fig. 5. Each magnetic clutch comprises a driving hub 42 keyed to the shaft 28 of the high speed roll by a key 43. Carried by the driving hub 42 is the field member or stationary clutch section 44 having a recess within which is positioned the magnetic winding or coil 45, covered by a shield 46. Loosely mounted upon the shaft 28 outwardly of the field member 44 is a sprocket wheel 47 provided around its periphery with the usual sprocket teeth 48. Secured to the sprocket wheel is a spring plate 49 carrying the armature member or movable clutch section 50 which is positioned opposite the clutch section 44. The sprocket wheels 47 are adapted to be driven by means of a sprocket chain trained thereabout and while a separate drive may be provided for the high speed rolls 25, they have been shown in Fig. 2 as being driven by the sprocket chain 21 which drives the rolls 18.

When it is desired to effect the positive rotation of the high speed rolls 26, and assuming that the sprocket wheels 47 are being driven, an electric circuit is first completed through the winding or coil 45 to energize the same and when this is done the clutch section 50 will be drawn over into engagement with the section 44. Upon engagement of these two sections, it will be apparent that the positive rotation of the sprocket wheels will be imparted to the rolls 26. When the circuit through the coil 45 is broken, the said coil will become de-energized and permit the clutch section 50 to be disengaged from section 44 whereupon the two sections will stand a short distance apart with a positive running clearance to allow the rolls 26 to idle.

During the formation of the glass sheet 15, it is preferred that the low speed rolls 25 be positively driven at a relatively slow speed or, in other words, at the same speed at which the sheet is adapted to be annealed and which may be for example in the neighborhood of five feet per minute. The sheet is preferably rolled at a relatively higher rate of speed such as for example approximately sixty feet per minute and during the rolling of the sheet, the high speed rolls 18 and 26 are positively driven at a speed substantially equal to the speed of sheet formation. As the sheet is received upon the conveyor table 17, it will be carried forwardly upon the rolls 18 and delivered at its speed of formation onto the rolls of the receiving section A of the annealing leer. As the sheet is delivered upon the receiving section A it will be carried forwardly by the positively driven high speed rolls 26 and due to the provision of the overrunning clutches, the low speed rolls will be caused to overrun their driving means and thereby synchronize with the high speed rolls. Thus, as the sheet is received upon the rolls of the receiving section A of the leer, it will overrun the low speed rolls and be carried forwardly by the high speed rolls. After the entire sheet has been received upon the conveyor section A, however, the coils 45 of the magnetic clutches are adapted to be deenergized so as to disconnect the drive from the high speed rolls 26. When this is done, the high speed rolls will rotate freely as idler rolls with the result that the sheet will gradually lose its forward speed. In other words, the high speed rolls and the low speed rolls are gradually slowed down as there will be no positive driving force acting upon them. As the rolls slow down the sheet will likewise be slowed down and when the rolls and sheet have slowed down to the proper annealing speed, the driving means for the low speed rolls will cause the same to be positively driven at the slow annealing speed of approximately five feet per minute to transfer the sheet at such speed into the annealing section B of the leer wherein it will be supported and carried along upon rolls 29.

From the above, it will be apparent that there is provided a simple yet efficient and practical means for changing the speed of travel of the sheet from its relatively high forming speed to its relatively slower annealing speed without the necessity of stopping the sheet and further without the necessity of raising and lowering any of the rolls or shifting the sheet either vertically or laterally.

It is preferred that the operation of the magnetic clutches associated with the high speed rolls 26 be automatically controlled by the movement of the sheet 15 through the annealing leer. To this end, there is provided the fixed and movable contacts 51 and 52 respectively, said contacts being preferably located within leer 24 and connected in series with the coils 45 and motor 22. The movable contact 52 is carried at one end of a rocker arm 53 having a pivotal mounting intermediate its ends as at 54. The movable contact 52 is normally held in engagement with the fixed contact 51 and when so engaged the electric circuit through the motor 22 will be completed to cause the energization of the coils 45 and the positive rotation of the high speed rolls. When the contacts are in engagement with one another, the lower end of rocker arm 53 will be disposed in the path of travel of the glass sheet. As the glass sheet, passing over the receiving section A of the leer, approaches the annealing section B, the forward end of the sheet engaging the rocker arm 53 will rock the same about its pivot 54 to cause the disengagement of the contacts 51 and 52. When this is done, the circuit through the coils 45 will be broken to cause the de-energization thereof and the disengagement of the clutch sections 44 and 50 so that the high speed rolls will be permitted to idle in the manner above described to cause a reduction in the speed of travel of the sheet. As the sheet passes out of engagement with the rocker arm, the lower end thereof will fall downwardly so as to again bring the fixed and movable contacts into engagement with one another and cause the positive rotation of the high speed rolls.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, means for positively driving said sets of rolls in the same direction at different speeds, and means for disconnecting the drive from one set of rolls to cause said rolls to run idle.

2. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, means for positively driving said sets of rolls in the same direction at different speeds, means associated with one set of rolls for causing said rolls to freely overrun their driving means, and means for disconnecting the drive from the other set of rolls to cause said rolls to run idle.

3. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, means for positively driving one set of rolls at a relatively slow speed, means for positively driving the other set of rolls at a relatively higher speed, and means for disconnecting the drive from the high speed set of rolls to cause said rolls to run idle.

4. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, means for positively driving one set of rolls at a relatively slow speed, means for positively driving the other set of rolls at a relatively higher speed, means associated with the low speed rolls for causing said rolls to freely overrun their driving means and synchronize with the high speed rolls, and means for disconnecting the drive from the high speed rolls to cause said rolls to run idle and thereby synchronize with the low speed rolls.

5. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, the rolls of one set being arranged alternately with the rolls of the other set, means for positively driving one set of rolls at a relatively slow speed, separate means for positively driving the other set of rolls at a relatively higher speed, and means operable by the sheet for disconnecting the drive from the high speed set of rolls to cause said rolls to run idle.

6. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, the rolls of one set being arranged alternately with the rolls of the other set, means for positively driving one set of rolls at a relatively slow speed, separate means for positively driving the other set of rolls at a relatively higher speed, means associated with the low speed rolls for causing said rolls to freely overrun their driving means and thereby synchronize with the high speed rolls, and means operable by the sheet for disconnecting the drive from the high speed rolls to cause said rolls to run idle and thereby synchronize with the low speed rolls.

7. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, the rolls of one set being arranged alternately with the rolls of the other set, means for positively driving one set of rolls at a relatively slow speed, separate means for positively driving the other set of rolls at a relatively higher speed, overrunning clutches associated with the low speed rolls for causing said rolls to freely overrun their driving means and thereby synchronize with the high speed rolls, magnetic clutches associated with the high speed rolls, and means actuated by the sheet for controlling the operation of the magnetic clutches to cause said rolls to be either positively driven or to run idle and thereby synchronize with the low speed rolls.

8. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, means for positively driving said sets of rolls in the same direction at different speeds, and means for rendering the driving means of either set of rolls ineffective to cause said rolls to freely rotate and synchronize with the rolls of the other set.

9. In sheet glass apparatus, a conveyor for receiving a newly formed sheet from a sheet forming mechanism at one speed and delivering it to an annealing zone at a relatively slower speed, including two sets of rolls arranged in the same horizontal plane and adapted to simultaneously engage the sheet and carry it forwardly, the rolls of one set being alternately arranged with the rolls of the other set, means for positively driving one set of rolls at a relatively slow speed, separate means for positively driving the other set of rolls at a relatively higher speed, overrunning clutches carried by the individual low speed rolls for causing said rolls to freely overrun their driving means and thereby synchronize with the high speed rolls, magnetic clutches carried by the individual high speed rolls, and means for controlling the operation of the magnetic clutches to cause said rolls to be either positively driven or to run idle and thereby synchronize with the low speed rolls.

Signed at Toledo, in the county of Lucas and State of Ohio, this 21st day of November, 1929.

JOSEPH P. CROWLEY.